United States Patent

Crawford et al.

[11] 3,721,330
[45] March 20, 1973

[54] ARTICLE TIMING AND FEEDING MECHANISM

[75] Inventors: Donald C. Crawford; Michael R. Nack, both of Green Bay, Wis.

[73] Assignee: FMC Corporation, San Jose, Calif.

[22] Filed: Feb. 8, 1971

[21] Appl. No.: 113,417

[52] U.S. Cl....................................................198/34
[51] Int. Cl.................................................B65g 47/26
[58] Field of Search ..............198/26, 34, 76; 53/159

[56] References Cited

UNITED STATES PATENTS

| 2,245,659 | 6/1941 | Everett | 198/34 X |
| 2,912,092 | 11/1959 | Cross | 198/34 X |
| 3,602,358 | 8/1971 | Jakobsson | 198/76 |

*Primary Examiner*—Edward A. Sroka
*Attorney*—F. W. Anderson and C. E. Tripp

[57] ABSTRACT

The disclosure concerns apparatus for reorienting a file of abutting articles into precisely positioned longitudinally spaced relation and for feeding the articles in exact timed relation to a processing machine, and operates by the interaction of plural chain conveyors with the articles, first to displace the leading article so that it has an accessible surface, and then to engage said surface and convey the article forwardly away from the succeeding articles.

9 Claims, 8 Drawing Figures

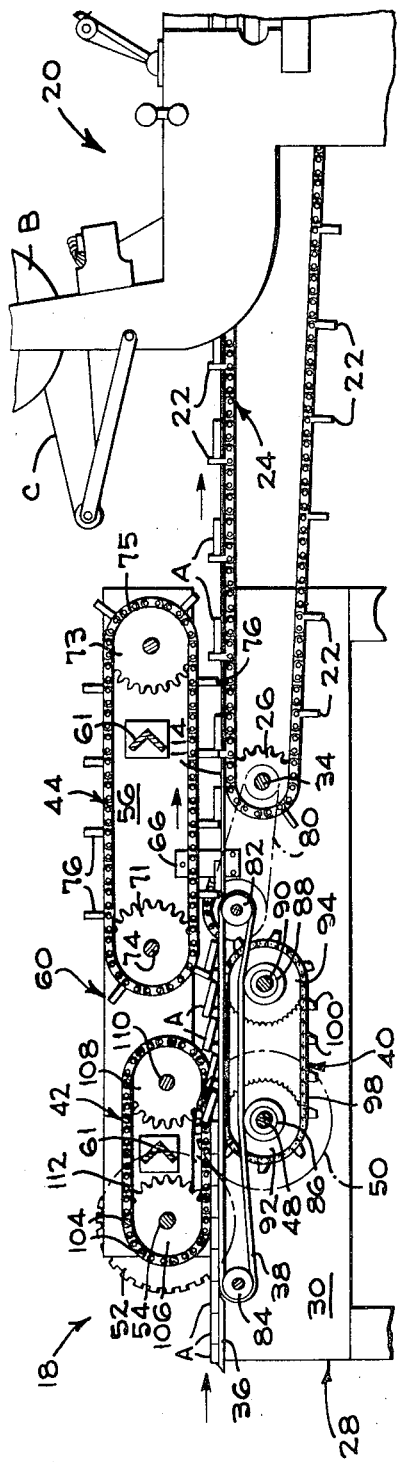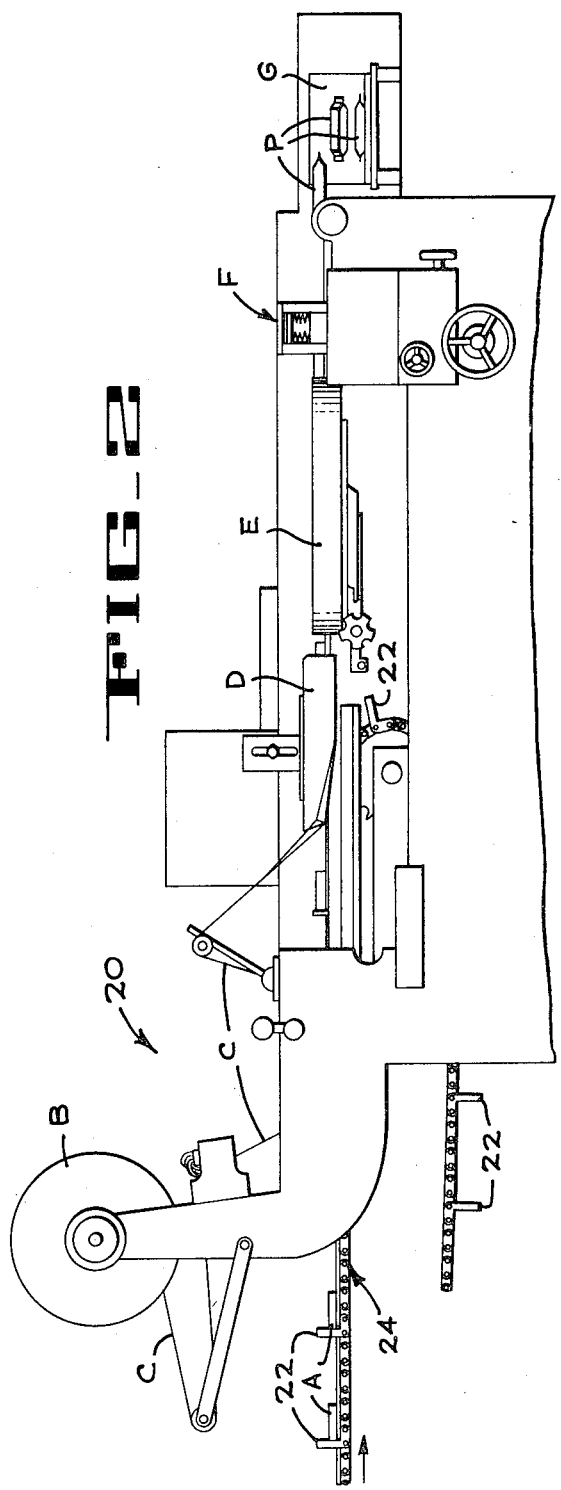

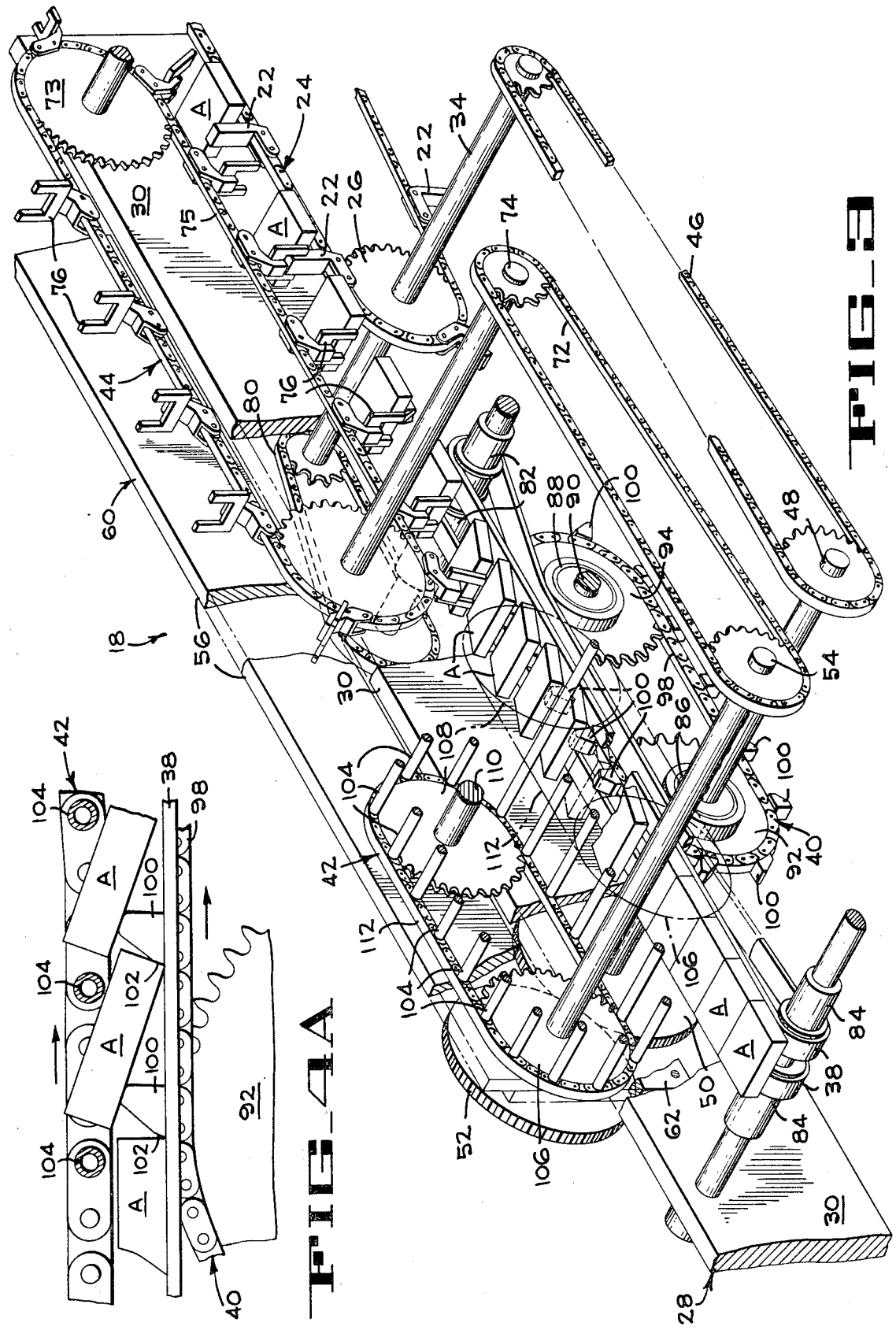

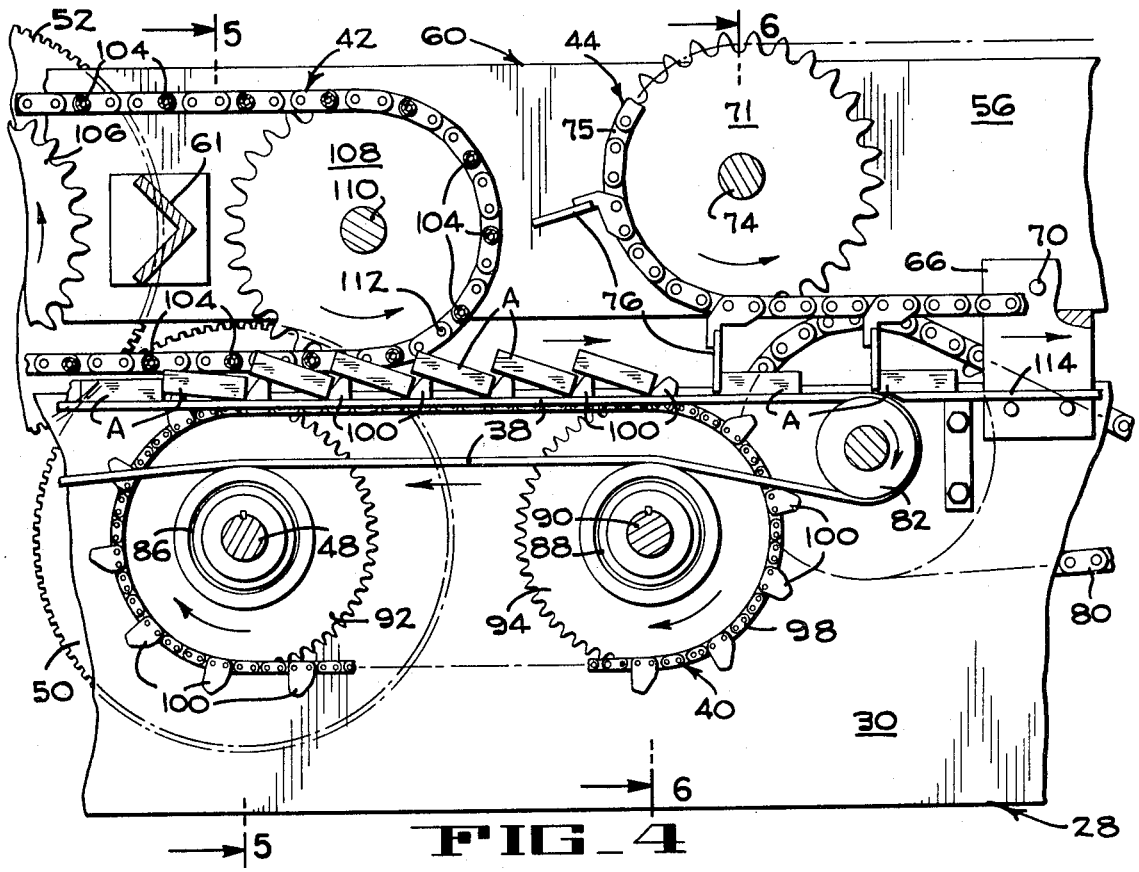
FIG_4
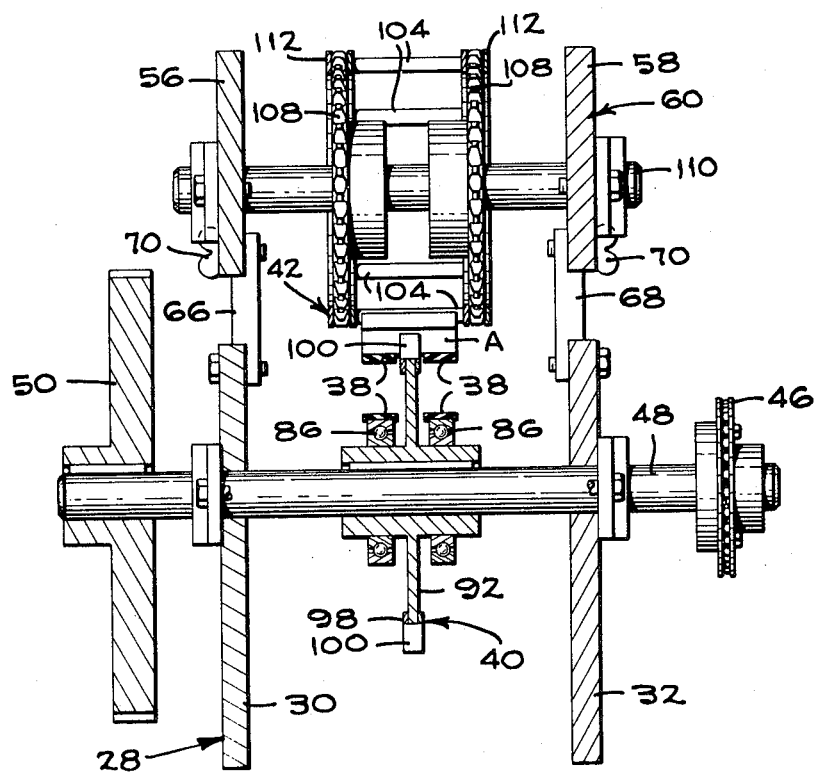
FIG_5

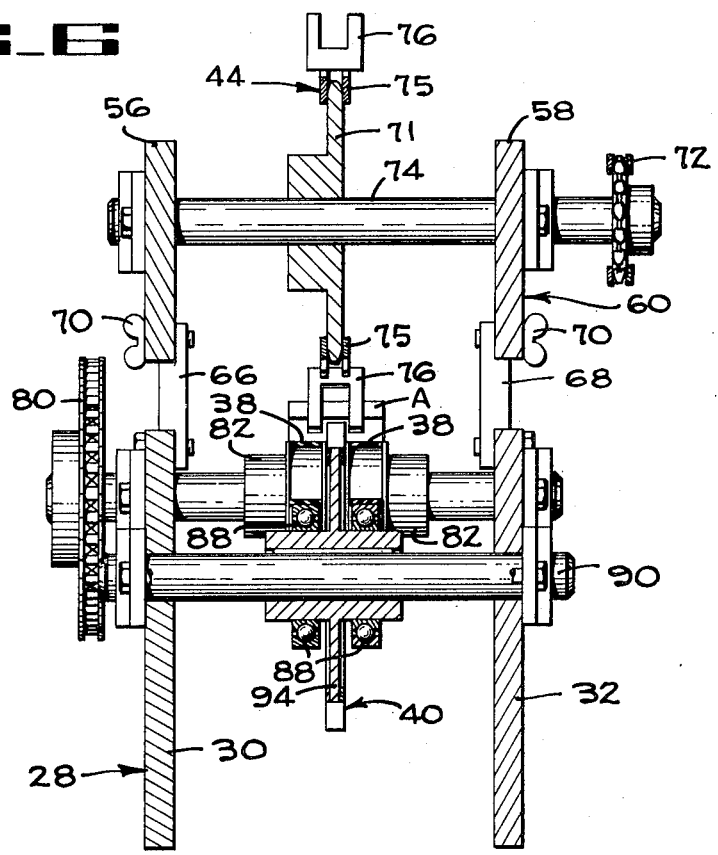
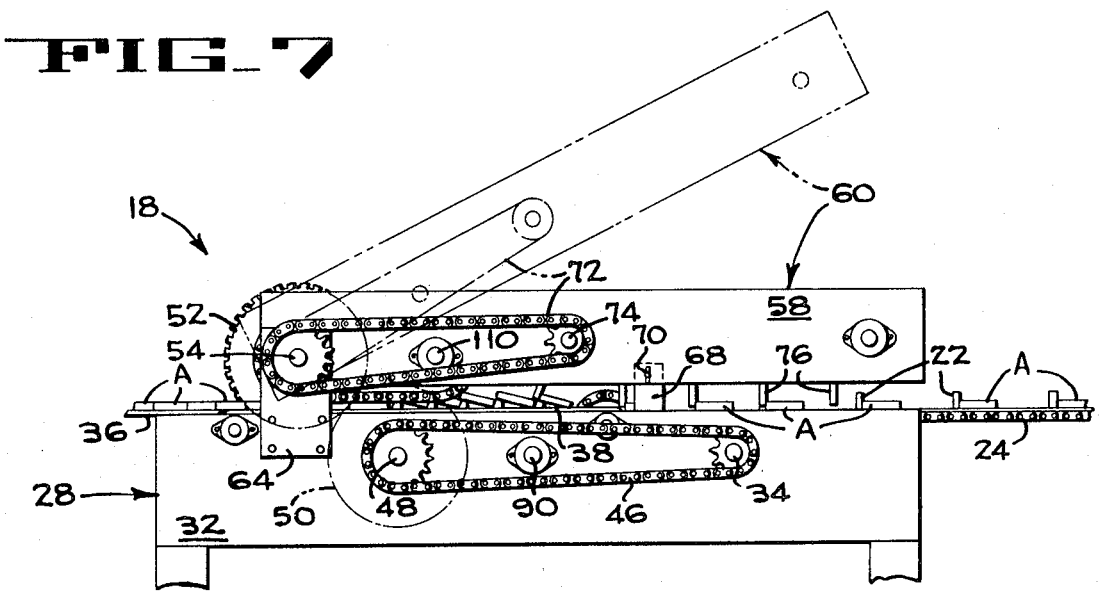

ARTICLE TIMING AND FEEDING MECHANISM

BACKGROUND OF THE INVENTION

The field of the present invention is article feeding mechanisms for interspacing a file of articles and conveying them to a processing machine with the articles precisely located one from another, and accurately timed relative to the operations of the processing machine.

Many different types of present processing machines require an input of accurately timed and spaced articles to properly feed the articles through the various stations of the machine, such as the placement of an empty carton in accurate indexed relation with a fixed filling chute, at a precise time in the operating cycle of a filling machine so that the filling charge is accurately placed in the container. As another example, and as is illustrated herein, wrapping machines require an accurately timed sequence wherein the articles or groups of articles to be wrapped are spaced apart some given distance, and are conveyed with an initially unfolded wrapper web through sealing, crimping and cutting zones to enclose the article by forming a sealed article package of the web. Article timing and spacing requirements are particularly acute when printed wrappers are used because the articles must be accurately positioned relative to the printed matter on the web.

Some prior art feed systems include an input conveyor having accurately spaced pusher lugs moving in timed relation to a processing machine.

In one manual prior art system, articles are hand loaded by operators who place each article in front of a pusher lug. Two operators, one on each side of the pusher lug flight can handle a relatively high input of articles per minute. However, to substantially increase the input rate by adding more operators or requiring more output from the initial number of operators may become unfeasible because of operator fatigue and inordinate length requirements for the pusher conveyor.

Automatic feed systems, such as the device disclosed in the Griner U.S. Pat. No. 3,155,221, are often characterized by unusual length requirements, are usually capable of handling only one specific type and size of product, and are often incapable of the degree of accurate positioning required in some machines to produce a closely conforming package with accurate article to wrapper placement.

In accordance with the present invention, the disadvantages indicated above are overcome in a compact mechanism which can handle a variety of different shapes and sizes of articles at high production rates, and which will accurately time and position the articles for the operations performed in a processing machine operatively connected to the article timing and feeding apparatus.

SUMMARY OF THE INVENTION

By displacing the trailing end of an article in a file of abutting articles, the trailing end surface of the article is accessible for engagement by a conveyor pusher.

According to one feature of the invention, the leading ends of this article and the succeeding article are restrained so that the displaced article is reoriented without affecting the succeeding article. The pusher gently accelerates the article to space it from the succeeding article.

Another feature of the invention is a second stage acceleration wherein another conveyor pusher again gently accelerates the article to its final spaced relation with the succeeding article. By this means, a high output of accurately interspaced articles is achieved without damage to fragile articles because the velocity changes and orienting movements are relatively small.

According to another feature of the invention the operating components are grouped in a lower and an upper frame with a single rotary drive train timing and driving interconnection, and a pivot hinge arranged to pivot the upper frame about an axis of the drive train. This allows quick access to the lower frame components, as well as the upper frame components, without disturbing their timed relation.

BRIEF DESCRIPTION OF THE DRAWINGS

FIG. 1 is a central longitudinal section through the article timing and feeding mechanism of the present invention, and includes a portion of the inlet end of a typical processing machine fed by the feeding mechanism.

FIG. 2 is an elevation of the processing machine shown in FIG. 1.

FIG. 3 is an enlarged schematic isometric of the article timing and feeding mechanism of the present invention, viewed from its inlet end.

FIG. 4 is an enlarged section of a portion of the timing and feeding mechanism shown in FIG. 1.

FIG. 4A is an enlarged fragmentary elevation of a portion of FIG. 4.

FIGS. 5 and 6 are transverse sections respectively taken along lines 5—5 and 6—6 on FIG. 4.

FIG. 7 is an elevation of the feeding and timing mechanism, similar to FIG. 1.

DESCRIPTION OF THE PREFERRED EMBODIMENT

The article timing and feeding mechanism 18 (FIGS. 1 and 2) of the present invention is hereinafter referred to as a feeding mechanism, and is useful with a variety of processing machines which operate seriatim upon single incoming articles, or groups of articles. One general example is a wrapping machine 20, described in U.S. Pat. Nos. 2,546,721 and 2,602,276, which encloses a series of interspaced articles in a web folded into an elongate tube around the articles, and which then transversely seals and severs the tube between the articles to form individual packages.

With more specific reference to the wrapping machine 20 (FIG. 2) a series of pushers 22 on the upper flight of a chain inlet conveyor 24 convey a file of articles A into the input end of the wrapping machine after the articles have been spaced apart by the feeding mechanism 18, as later described. In the present case, it is convenient to extend the conveyor 24 around a sprocket 26 (FIG. 1) mounted in the discharge end portion of the feeding mechanism 18 to obtain a source of driving power which is timed to the operation of the wrapping machine. As will later become apparent, this specific drive arrangement is not critical to the operation of the feeding mechanism 18.

An overhead spool B on the wrapping machine 20 supplies web material C which is trained through a forming plow D and moves at approximately the speed of the incoming articles. The web is transversely curled downward at each edge to form a tube encasing the articles, and is longitudinally sealed adjacent the underside of the plow D to produce a continuous tubular web having a series of uniformly spaced articles therein.

The entubed articles are conveyed downstream, in the particular wrapping machine illustrated, by lateral conveying belts at E which grip the tube and feed it through a rotary sealing head unit F. The sealing head unit transversely seals and severs the web between adjacent articles to form individually sealed packages P which are then discharged from the machine on a discharge chute G, or by other discharge means as suits a particular installation.

With reference to FIG. 1 and the general organization and functions of the article feeding mechanism 18 of the present invention, a floor-supported frame 28 is provided with spaced side plates 30 and 32. Bearings, not shown, are attached to the side plates and support a cross shaft 34 that carries the sprocket 26 for the inlet conveyor 24 of the wrapping machine 20. Since the conveyor 24 is driven by the wrapping machine 20, the cross shaft 34 provides timed input power for the feeding mechanism 18.

The general operating principles of the feeding mechanism 18 (FIG. 1), later described in detail, are as follows: The incoming articles A are in end to end abutting relation and may be fed by various means not shown herein, such as a simple belt conveyor operated at a velocity which will remove any interspacing the articles may have, or a gravity chute which will accomplish the same function. Traveling over a dead plate 36 at the inlet end of the feeding mechanism 18, the articles become supported and conveyed by two laterally spaced driven belts 38, only one belt being shown in FIG. 1. Located between the belts 38 is the upper flight of a lifting conveyor 40 which operates to lift the trailing end of each article while an overhead hold down conveyor 42 prevents upward displacement of the leading ends of the articles. Each article in turn is thus moved out of its former abutting relation with the adjacent articles so that the lower flight of an overhead pusher conveyor 44, operated at a velocity higher than the velocity of the conveyor belts 38, can engage the trailing end surfaces of the articles and move each article forwardly away from the next succeeding article. The articles are thus spaced apart by the pusher conveyor 44 and each article is thereby positioned ahead of one of the pusher lugs 22 of the wrapping machine 20.

The ensuing description concerns particular structural details and features of the feeding mechanism 18. For transferring the input power to the operating components, the driven cross shaft 34 (FIG. 3) extends through the near side plate 32 (FIGS. 5 and 7) and is connected by a chain and sprocket drive unit 46 to a driveshaft 48. Driveshaft 48 extends through the opposite side plate 30 and carries an outboard gear 50. Presently described in detail, the driveshaft 48 powers the conveyor 40 that displaces the trailing ends of incoming abutting articles, and the article hold down conveyor 42 that prevents the leading end of each article from lifting.

For driving the hold down conveyor 42 at the same velocity as the lifting conveyor 40, the gear 50 is meshed with a gear 52 of the same size that directly drives the hold down conveyor. Thus, the gear 52 is mounted on one end portion of a driveshaft 54 that powers the hold down conveyor and extends through spaced plates 56 and 58 (FIG. 5) of a pivotable upper frame 60. Tie beams 61 rigidly interconnect the plates 56 and 58. In accordance with a feature of the present invention, quick access to both the upper and lower frame components is provided for without disturbing their timed relation. Thus, the upper frame 60 is provided with a pivotal mounting which allows it to be swung upward about the axis of the driveshaft 54, as indicated in phantom lines in FIG. 7, to a vertical position for maintenance access to the lifting conveyor 40 and associated mechanisms, and for clearing possible jams. For this purpose, the driveshaft 54 is supported by pivot plates 62 and 64 (FIGS. 3 and 7) which are respectively secured to the lower frame side plates 30 and 32, and the driveshaft 54 extends through the side plates 56 and 58 of the upper frame 60. The other end portion of the frame 60 is supported in its operating position by support blocks 66 and 68, also respectively secured to the lower frame side plates 30 and 32. Wing bolts 70 provide for the quick release of the frame 60 and lock it in parallelism with the frame 28. Since there are no connecting chains between the frame 28 and the frame 60, the upper frame is free to be swung up about the axis of the driveshaft 54 when the wing bolts are removed, and the gears 50 and 52 remain meshed to preserve the timing.

The other end portion of the driveshaft 54 (FIG. 3) is connected to a chain and sprocket drive unit 72 that powers a driveshaft 74 for the pusher conveyor 44. Conveyor 44 comprises a drive sprocket 71, an idler sprocket 73, and a chain 75 having pusher lugs 76 which travel at a greater velocity than the articles A. For driving the conveyor belts 38, the driveshaft 34 extends through the lower frame side plate 30 and is connected by a chain and sprocket drive 80 to a drive pulley 82. Trained around the drive pulley 82 and an idler pulley 84 at the inlet end of the feeding mechanism 18, the lower flights extend over and are supported by the outer races of two ball bearings 86 on the axis of the shaft 48, and the outer races of two ball bearings 88 on the axis of an idler shaft 90 for the lifting conveyor 40.

As best shown in FIG. 4, the lifting conveyor 40 includes a drive sprocket 92 on the driveshaft 48, an idler sprocket 94 on the idler shaft 90, and an endless chain 98. The bearings 86 and 88 are mounted on the hubs of the sprockets, as shown in FIGS. 5 and 6. The chain 98 carries an endless series of lifting lugs 100 having rounded outer ends, as shown in FIG. 4A, to accommodate slight relative movement between the articles A and the lugs as the lugs rise between the conveyor belts 38. Further, each lug (as oriented along the upper flight) has a ledge portion at 102 which lies above the plane of the conveyor belts 38 for engagement by the leading lower corner of the article.

In accordance with one feature of the invention, means are provided to assure that as the trailing end of one article is raised the leading end of the succeeding article is not raised due to the abutting interengagement of the articles. For this purpose, the hold down conveyor 42 (FIG. 3) positions a hold down rod 104 (FIG. 4A) over the leading end of each article. Thus, the hold down conveyor 42 includes a spaced pair of sprockets 106 on the shaft 54, and an aligned pair of sprockets 108 on an idler shaft 110. The hold down rods 104 extend between chains 112 trained around the pairs of sprockets, and are conveyed at a velocity matching that of the lifting lugs 100, but in horizontally offset relation.

Since the lifting lugs 100 (FIG. 4) and the pushers 22 (FIG. 3) extend partially under the pusher conveyor 44, the pusher lugs 76 have bifurcated article-engaging end portions, as clearly shown in FIG. 3, to clear the lifting lugs and the pushers. As previously indicated, the pusher lugs 76 travel at a higher velocity than the lifting lugs 100, and each article in turn is cooperatively fed by the conveyor belts 38 and the lifting lugs 100 ahead of one of the pusher lugs 76. The article is thus gently accelerated away from the succeeding article as the leading lifting lug for the article engaged by the pusher lug descends over the sprocket 94, and the article is slid across two spaced, fixed support plates, one of which is shown at 114 (FIG. 4) for delivery toward the wrapping machine 20.

In accordance with another feature of the invention, the articles are subjected to two-stage acceleration so that velocity changes and abrupt movements, which might damage fragile articles, are small. As shown in FIG. 1, the articles on the support plates 114 then pass over the driven sprocket 26 of the inlet conveyor 24 and one of the pusher lugs 22 of conveyor 24 moves upward over the sprocket to index one of the pusher lugs 76. The pusher lug 22 travels slightly faster than the pusher lug 76 and thereby causes a second acceleration of the article for accurate timed delivery into the wrapping machine 20.

To summarize the structural features and functions of the described embodiment of the invention, it is important to note that abrupt and forceful velocity or directional changes of the articles are avoided, and that the incoming articles are first gently reoriented from abutting relation, and are then accelerated in two stages to their final spaced relation, first by the pusher conveyor 44, and then by the inlet conveyor 24. This mode of operation, in practical terms, means that high production rates can be obtained with the least operating difficulties such as article damage or the need of operator attention. In regard to conveyor 24, it should also be noted that it can be properly considered as a discharge conveyor and a part of the feeding mechanism 18 for those applications where it may not be necessary or desirable to incorporate the conveyor 24 with the processing machine which is fed. Further features which particularly suit the feeding mechanism 18 to high production processing facilities are the capability of pivoting the upper frame 60 (FIG. 7) for quick access to the operating components without disturbing the timing, and the relatively simple construction which contributes to easy maintenance and low cost. Another noteworthy point is that the feeding mechanism 18 has a large degree of versatility because the operating principles do not inherently limit the type or size of articles which can be handled, providing that the incoming articles are in abutting relation.

Although the best mode contemplated for carrying out the present invention has been herein shown and described, it will be apparent that modification and variation may be made without departing from what is regarded to be the subject matter of the invention.

What is claimed is:

1. Article feeding apparatus comprising means for moving a file of abutting articles along a predetermined linear path, means for upwardly displacing the trailing end of the leading moving article from said path to expose its trailing end surface, and means for engaging said trailing end surface and moving the article along said path forwardly away from the next succeeding article.

2. Article feeding apparatus comprising means for conveying a file of abutting articles along a predetermined linear path at a given velocity, means adjacent said path for upwardly displacing the trailing end of each moving article at a given point along said path to move the article out of abutting engagement with the next adjacent article and expose its trailing end surface, and means adjacent said displacing means for engaging said trailing end surface of the article and moving the article along said path at a higher velocity to increase the spacing of the articles in said file.

3. Article feeding apparatus comprising means for continuously moving a file of abutting articles along a predetermined path, means for preventing upward displacement of the leading portion of the leading article, reorienting means for upwardly displacing the trailing end of said article to expose its trailing end surface, and means for engaging said trailing end surface of the reoriented article and moving the article forwardly away from the next succeeding article.

4. Apparatus for feeding articles into a processing machine comprising means for conveying a file of abutting articles along a predetermined path, means beneath said path for displacing the trailing end of each moving article upward at a given point along said path so that the formerly abutting trailing end surface of the article is now exposed, pushing means above said path for engaging said trailing end surface and moving the article forwardly away from the next succeeding article, and means driving said displacing and pushing means in timed relation with said processing machine.

5. Apparatus according to claim 4 wherein said driving means is provided by a driving connection between said processing machine and said feeding apparatus to both time and space the articles into said processing machine.

6. Article feeding apparatus comprising a stationary frame, means mounted in said frame for conveying a file of abutting articles along a predetermined path, means for upwardly displacing the trailing end of each article at a given point along said path, a pivot frame overlying said stationary frame, hold down means mounted in said pivot frame for preventing upward displacement of the leading ends of the articles, a rotary drive train interconnecting said displacing means and said hold down means, and a pivot hinge interconnecting said pivot frame and said stationary frame for upward swinging movement of said pivot frame about an axis of said rotary drive train, said displacing means thus being readily accessible without interrupting the timing of said hold down means and said displacing means.

7. Article feeding apparatus comprising means for conveying a single file of articles along a linear path, superposed hold down means for preventing upward displacement of the leading ends of said articles, subposed lifting means for upwardly displacing the trailing ends of said articles while said leading ends are restrained, said hold down means terminating before the end of said lifting means so that the trailing ends of the now reoriented articles are accessible, superposed pusher means for engaging the trailing end of the leading article and accelerating the article to a first increased velocity away from the succeeding article, and subposed pusher means for engaging the trailing end of the leading article and accelerating the article to a second increased velocity in order to achieve gentle handling of the articles simultaneously with a high output rate.

8. Article feeding apparatus according to claim 7 and a first gear driven by said lifting means, a second gear meshed therewith for driving said hold down means, a substantially horizontal stationary frame supporting said lifting means, a pivot frame overlying said main frame and supporting said hold down means, and a pivot hinge interconnecting said frames for swinging movement of said pivot frame about the axis of one of said gears between substantially horizontal and vertical positions.

9. An article handling method comprising the steps of moving a file of abutting articles along a predetermined path, preventing upward movement of the leading portion of the leading article, raising the trailing end of said article to tilt the article and expose its trailing end surface, and engaging said trailing end surface of the tilted article and moving the article forwardly away from the next succeeding article.

* * * * *